(12) United States Patent
Floarea (10) Patent No.: US 6,742,835 B1
(45) Date of Patent: Jun. 1, 2004

(54) ROCKER PANEL MOLDINGS (75) Inventor: George C. Floarea, Whitby (CA)

(73) Assignee: General Motors of Canada Limited, Oshawa (CA)

( * ) Notice: Subject to any disclaimer, the term of this patent is extended or adjusted under 35 U.S.C. 154(b) by 0 days.

(21) Appl. No.: 10/452,345

(22) Filed: Jun. 2, 2003

(51) Int. Cl.[7] .............................................. B62D 25/20
(52) U.S. Cl. .................................. 296/209; 296/203.03
(58) Field of Search ........................... 296/209, 193.05, 296/193.07, 205, 203.03, 1.03; 280/785

(56) References Cited

U.S. PATENT DOCUMENTS 4,252,364 A * 2/1981 Toyama et al. ........ 296/203.01
5,938,275 A * 8/1999 Kleinhans et al. ...... 296/203.03
6,102,473 A * 8/2000 Steininger et al. .......... 296/209

* cited by examiner

Primary Examiner—D. Glenn Dayoan
Assistant Examiner—Patricia Engle
(74) Attorney, Agent, or Firm—Laura C. Hargitt (57) ABSTRACT

Rocker moldings are molded of polymer material and include a front section and a rear section joined by bridge arrangements. A preferred embodiments includes two bridge elements connected to a rear edge of the front section and to a front edge of the rear section. The bridge elements span a gap between the front and rear edges and allow for longitudinal expansion of the rocker panel moldings to accommodate thermal expansion in the underlying rocker panels and to provide for slight longitudinal adjustment in the rocker panel moldings while fitting the moldings to rocker panels.

12 Claims, 8 Drawing Sheets

ROCKER PANEL MOLDINGS

FIELD OF THE INVENTION

The present invention is directed to rocker panel moldings. More particularly, the present invention is directed to rocker panel moldings that are adjustable during mounting.

BACKGROUND OF ART

Figure 1:
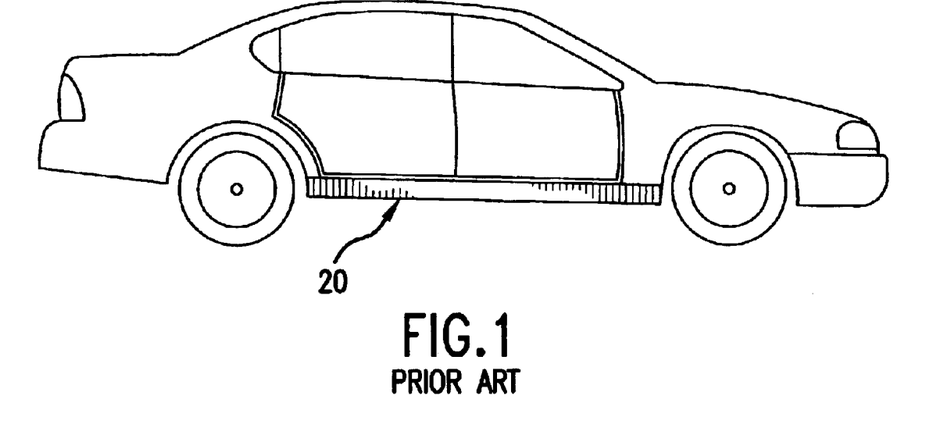
FIG. 1 is a schematic side view of the first prior art rocker panel molding.
Figure 2:
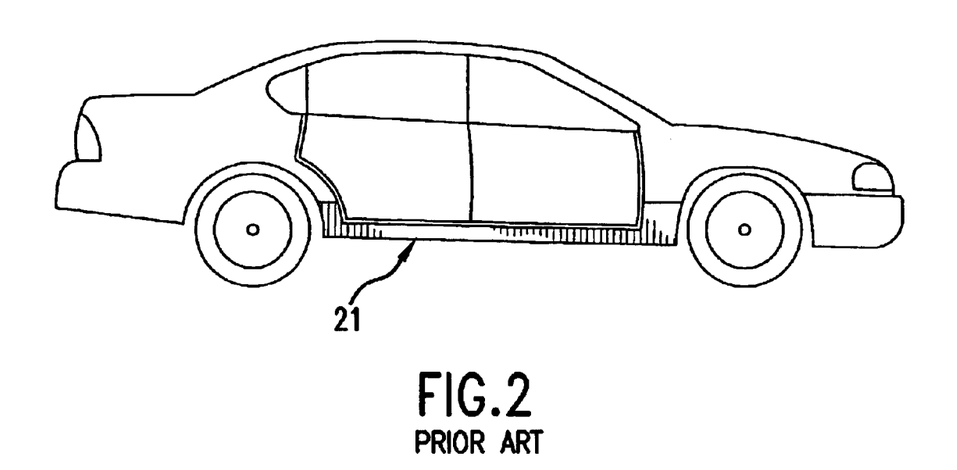
FIG. 2 is a schematic side view of a second prior art rocker panel molding.

Rocker panels are automobile body structures that cover side members of a vehicle's frame that are located beneath the vehicle's doors and extend along opposite sides of the vehicle between lower portions of the vehicle's fenders. Rocker panels are frequently covered with rocker panel moldings generally made of rubber or rubber-like resinous materials and are attached to rocker panels by clips. In accordance with a first prior art approach, rocker panel moldings are configured either as straight, unitary moldings as seen in FIG. 1, or as unitary moldings with lateral portions that extend upwardly at vehicle wheel wells as is seen in FIG. 2. In accordance with a second prior art approach shown in FIG. 3, prior art rocker panel moldings are separated into two independent parts with a gap there between. A tab projecting longitudinally from one part creates an overlap to visually close the gap.

SUMMARY OF THE INVENTION

The present invention is directed to rocker panel moldings for attachment to rocker panels on automotive vehicles, wherein the rocker panel moldings are configured as units each having a front section and a rear section, each section having an exterior surface adapted to face outwardly with respect to an automotive vehicle and an interior surface adapted to face inwardly toward the automotive vehicle. The front and rear sections further have upper edge portions and lower edge portions with the front section having a rear edge and the rear section having a front edge. The rear edge and the front edge are separated by a gap that is bridged by at least one flexible bridge element. The bridge element has a front end and a rear end, the front end being in cooperative relationship with the rear edge of the front section and the rear end being in cooperative relationship with the front edge of the rear section.

In a further aspect of the invention, the bridge element is unitary with the front and rear sections of the rocker panel molding, and in still another aspect of the invention there are two bridge elements spanning the gap between the front and rear sections, one bridge element being positioned proximate the upper edge portion of the rocker panel molding and the other bridge element being positioned proximate the lower edge portion of the rocker panel.

In still a further aspect of the invention, a tab extends from the end edge of one section into the gap between the sections and toward the end edge of the other section to slide behind, or into, the end edge of the other section in order to visually close the gap upon moving the end edges toward one another.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 3:
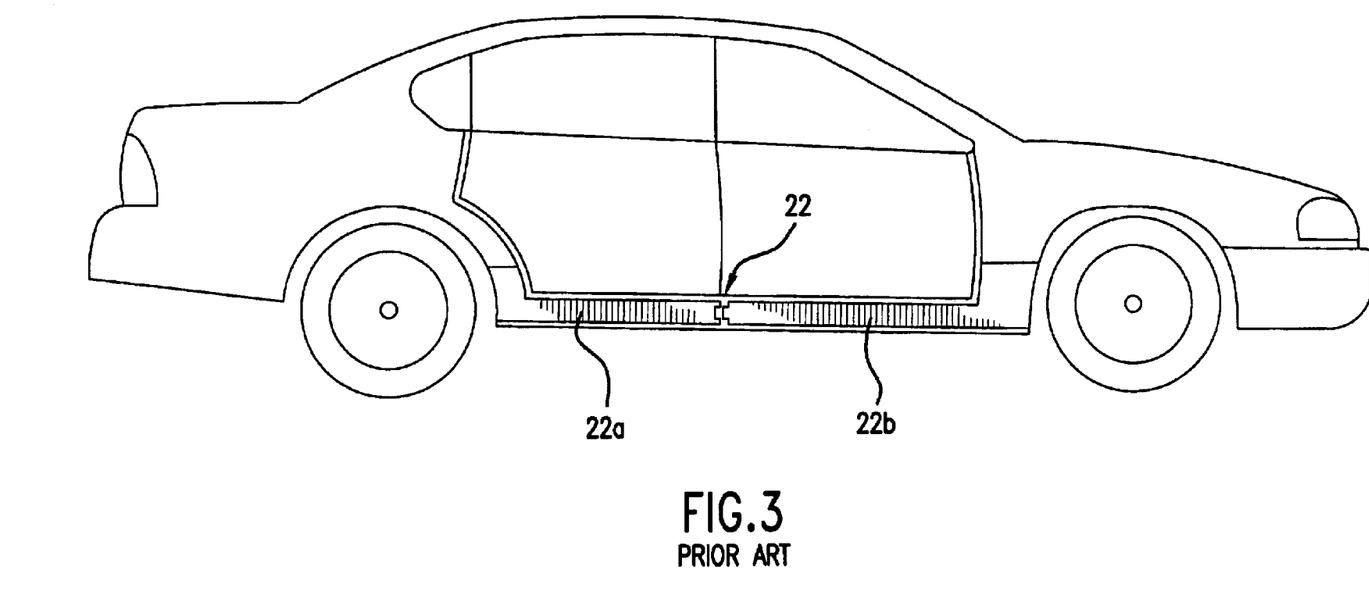
FIG. 3 is a schematic side view of a third prior art rocker panel molding, wherein the rocker panel is in two sections.

FIGS. 1–3 are side views of prior art rocker panel molding configurations, wherein rocker panel moldings 20 and 21 of FIGS. 1 and 2 are configured as unitary pieces and wherein the rocker panel molding 22 of FIG. 3 is comprised of two completely separate sections 22a and 22b.

Figure 4:
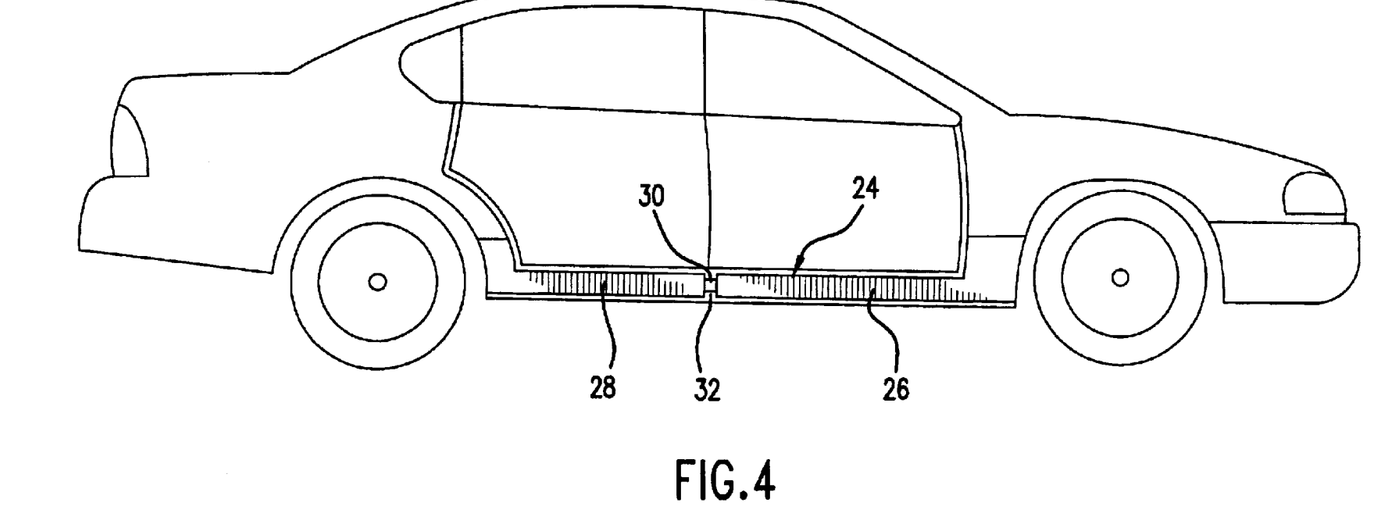
FIG. 4 is a schematic side view of a rocker panel molding configured in accordance with the present invention.

FIG. 4 illustrates generally a rocker panel molding 24 configured in accordance with the principles of the present invention, wherein the rocker panel molding includes a front section 26 and a rear section 28, the front and rear sections being joined by a bridge arrangement 30 spanning a gap 32 between the sections. The rocker panel moldings 24 configured in accordance with the principles of the present invention are assembled on the automotive vehicle as one piece with the front and rear sections 26 and 28 preferably unitary with the bridge arrangement 30. Alternatively, the front and rear sections 26 and 28 may be integral with the bridge arrangement 30, the bridge arrangement being a separate piece which is attached to the front and rear sections of the rocker panel. In either arrangement, the bridge arrangement 30 is flexible so that the gap 32 between the front and rear sections 26 and 28 can be narrowed or widened to accommodate variations in the relatively long rocker panel lengths due to thermal expansion of rocker panels or due to other situations.

Figure 5:
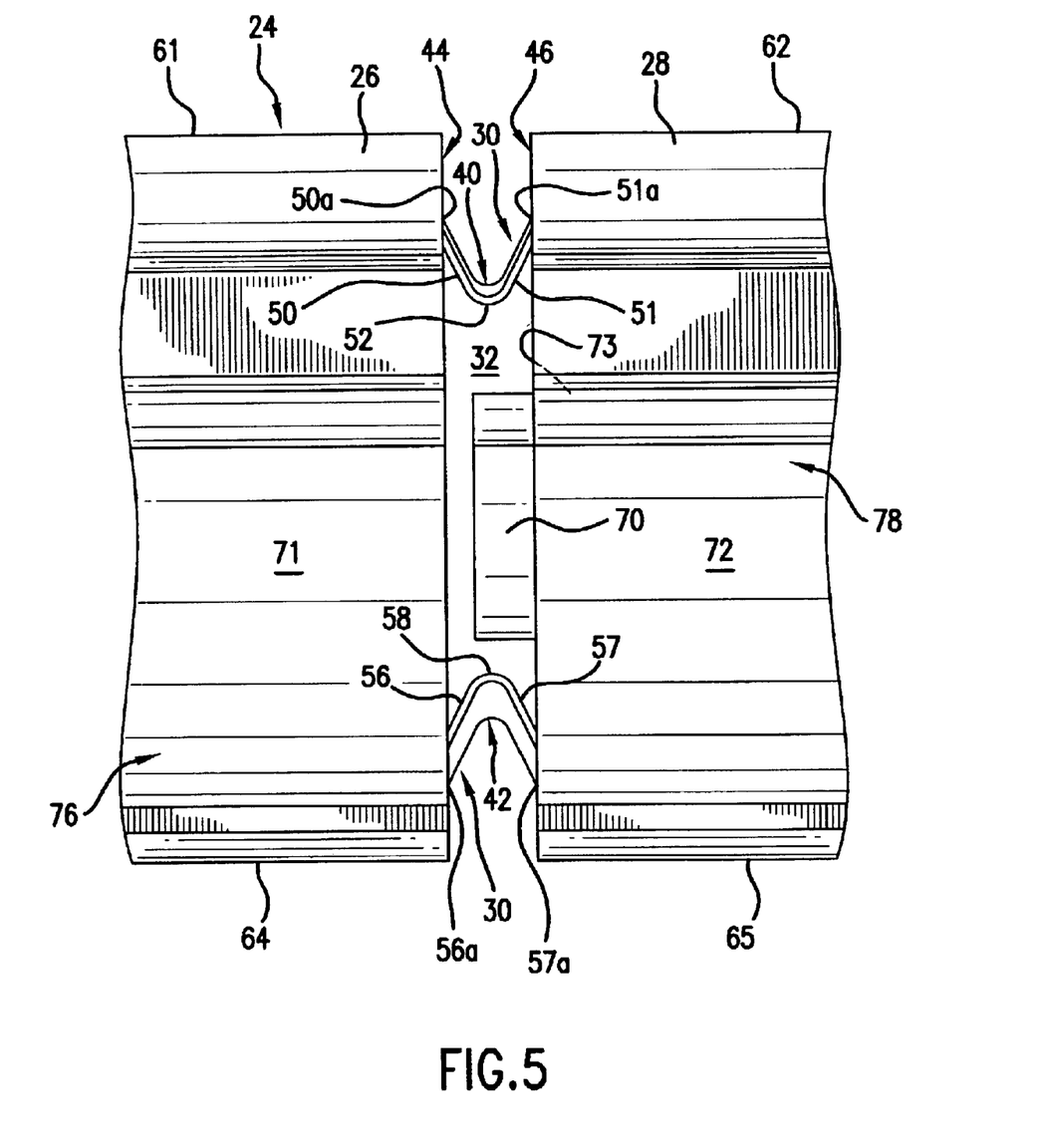
FIG. 5 is a perspective front view of portions of a rocker panel molding according to a first embodiment of the present invention.
Figure 6:
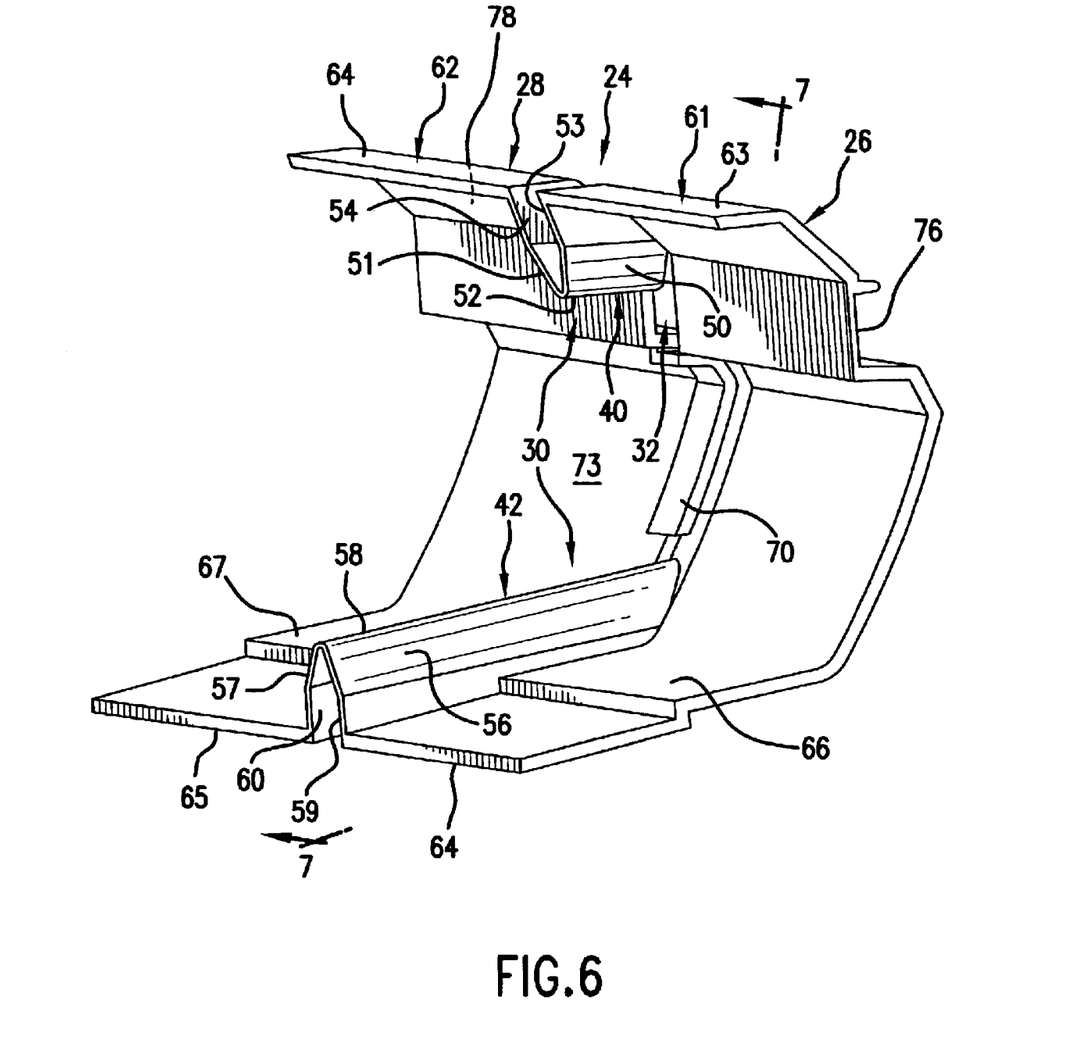
FIG. 6 is a perspective rear view of the portions of the rocker panel molding of FIG. 5.

FIGS. 5 and 6 are front and rear views of a first embodiment of the rocker panel 24 showing the bridge arrangement 30 comprised of an upper bridge element 40 and a lower bridge element 42. The bridge elements 40 and 42 are generally V-shaped and are unitarily molded with the front and rear sections 26 and 28 of the rocker panel molding 24, thereby connecting the rear edge 44 of the front section 26 to the front edge 46 of the rear section 28.

Figure 7:
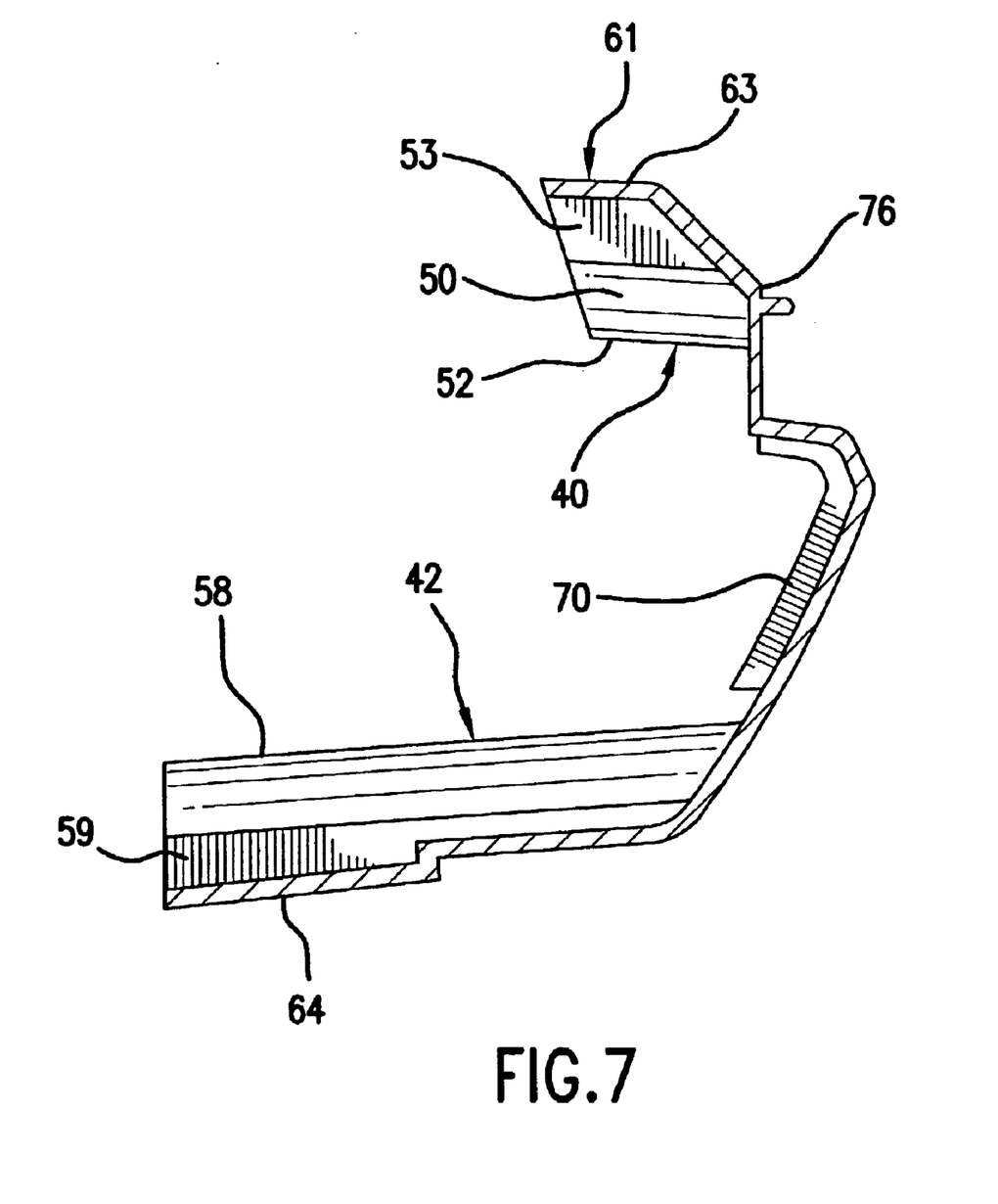
FIG. 7 is a perspective top view of the portions of the rocker panel molding shown in FIGS. 5 and 6, and FIGS. 8–14 are top views of various embodiments of bridge elements connecting front and rear sections of rocker panel moldings in accordance with the present invention.

Considering the bridge elements 40 and 42 in more detail, it is seen that the upper bridge element 40 has front and rear spans 50 and 51 which are connected to one another by an arcuate bight 52, the front span 50 having a front end 50a unitary with the rear edge 44 of the front section 26, and the rear span 51 having a rear end 51 a unitary with the front edge 46 of the rear section 28. Bridge element 42 has a front span 56 and a rear span 57 which are connected by a bight 58 with the front span 56 having a front end 56a unitary with the rear edge 44 of the front section and rear span 57 having a rear end 57a unitary with the front edge 46 of the rear section 28. As is seen in FIGS. 6 and 7, spans 50 and 51 are displaced downwardly from upper edge portions 61 and 62 defined by upper side plates 63 and 64, respectively, on the front and rear sections 26 and 28, respectively, while the spans 56 and 57 of the lower bridge element 42 are unitary with the rear and front edges 46 and 48 of the front and rear sections at locations displaced upwardly from the lower edge plates 64 and 65, defined by stepped lower side plates 66 ad 67 on the front and rear sections. Consequently, the bights 52 and 58 are disposed inboard of the front and rear ends 50a and 51 a of legs 50 and 51 and inboard of the front and rear ends 56a and 57a of the legs 56 and 57.

The bridge elements 40 and 42 flex so that the gap 32 can be widened or narrowed in order to slightly adjust the longitudinal length of the single rocker panel molding 24. As is seen in FIG. 7, the widths of bridge elements 40 and 42 are no greater than the depth of the upper panel molding 24.

As is seen in the rear view of FIG. 6, legs 50 and 51 of the V-shaped bridge element 40 are supported by flanges 53 and 54 which extend downwardly from upper side plates 63 and 64 on the front and rear sections 26 and 28, respectively. The lower V-shaped bridge element 42 projects upwardly from a vertical flange 59 connecting leg 56 thereof to stepped side plate 64, while flange 60 connects leg 57 to stepped lower side plates 66 and 67 on the front and rear sections 26 and 28.

As is further evident from FIGS. 5–7, the rocker panel molding 24 is convex when viewed from the exterior in FIG. 5 and is concave when viewed from the interior in FIG. 6. These contours are the result of the upper edge plates 61 and 62 and lower stepped side plates 64 and 65 projecting laterally with respect to the longitudinal axes of the front and rear sections 26 and 28. The upper side plates 63 and 64 are joined by contoured front plate sections 76 and 78 having sections which slope away from the upper plates 61 and 62 and toward the lower stepped side plates 66 and 67 to provide a selected configuration for the rocker panel molding 24, so that the rocker panel molding 24 has a concave interior surface which accommodates the width of the bridge arrangement 30 comprised of the bridge elements 40 and 42.

Optionally, a tab 70 projects from one of the end edges 44 or 46 and fits behind front surfaces 71 and 72 of the sections 26 and 28 to span the gap 32 so as to make the gap less visually noticeable. Since the gap 32 is in the range of ⅛" to ⅜", the tab 70 combined with the presence of the bridging elements 44 and 42 substantially closes the gap visually. Tab 70 preferably projects from back surface 73 of the section 28 so that it is stepped from behind the end edge 46 by the thickness of the panel molding 24 to readily slide behind the front section 26.

Figure 8:
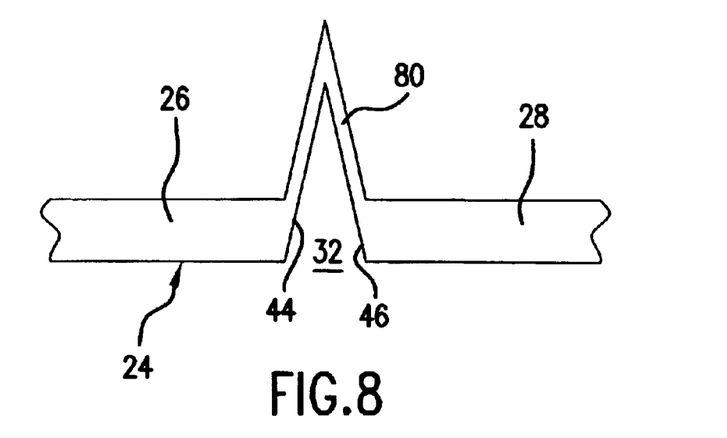
Figure 9:
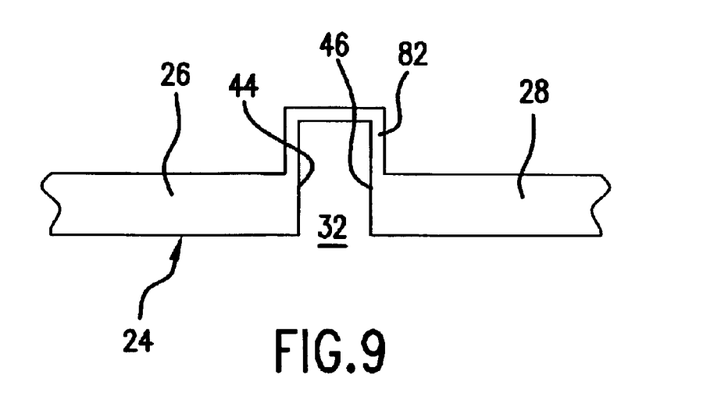
Figure 10:
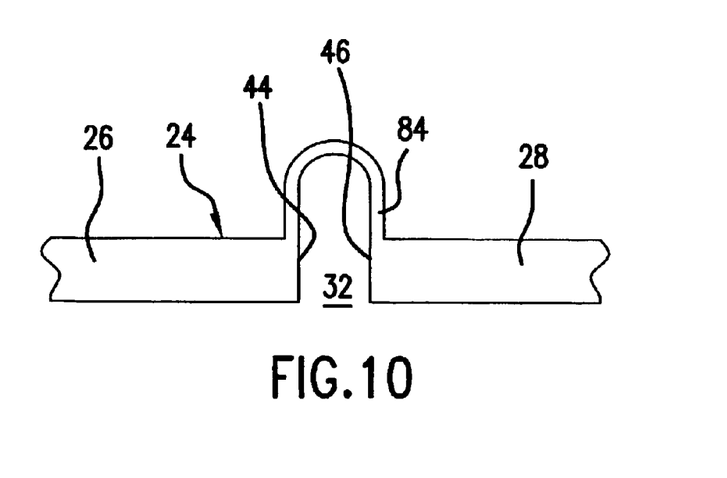
Figure 11:
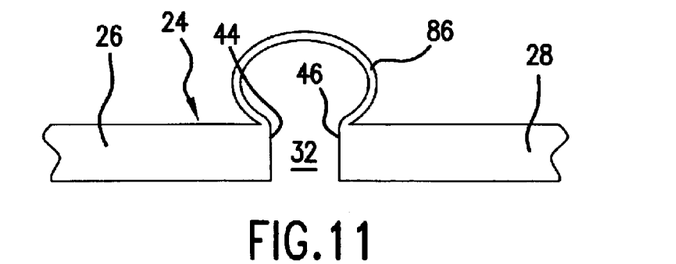
Figure 12:
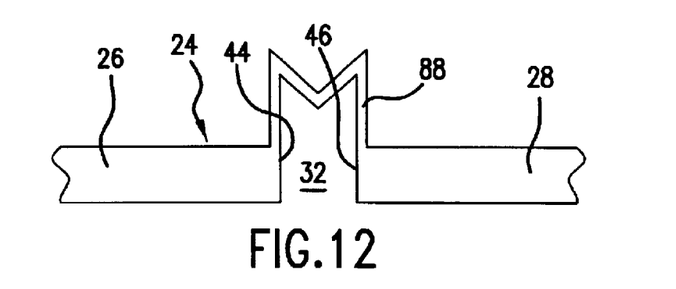
Figure 13:
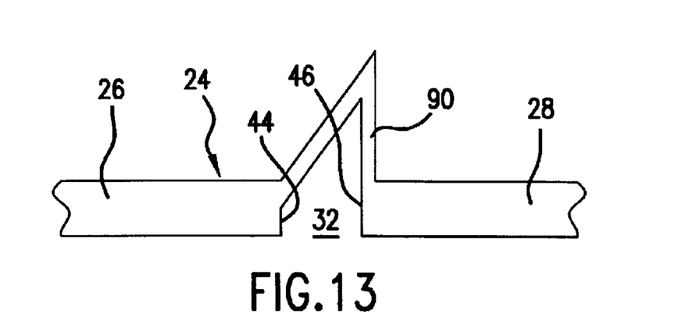
Figure 14:
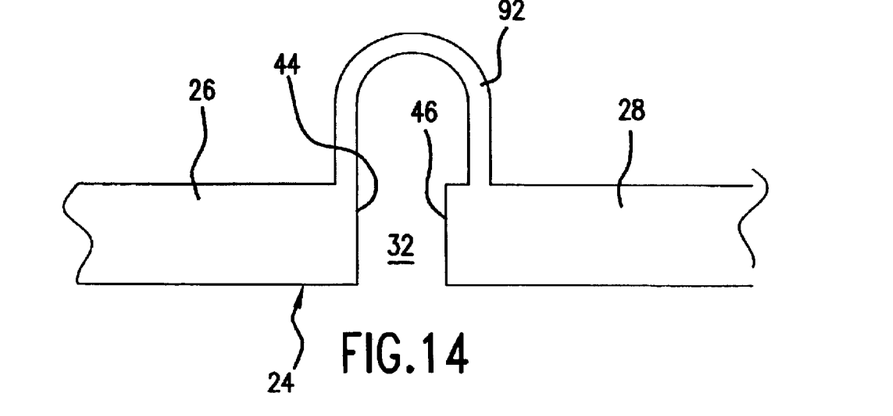

While the V-shaped bridge elements 40 and 42 with legs shown in FIGS. 5–7 disclose a preferred embodiment of the invention, the bridge arrangement 30 may assume various shapes as is indicated in FIG. 8–14 which are schematic views of rocker panel moldings 24. In each case the front and rear edges 44 and 46 of the sections 26 and 28 are connected by spans, such as the spans 50, 51, 56 and 57 of FIGS. 5–7 which are joined by bights 52 and 58. In FIG. 8, the bridge element 80 is completely V-shaped as opposed to being V-shaped with flanges, as is the case in FIGS. 5–7. In FIG. 9, the bridge element 82 is polygonal, rectangular or square shaped, and in FIG. 10, the bridge element 84 is U-shaped with an arcuate bight portion. In FIGS. 11 and 12 the bridge elements 86 and 88 are arcuate or oval and M-shaped, respectively, while in FIGS. 13 and 14, bridge elements 90 and 92 have irregular shapes and are attached either to the end edges 44 and 46 of the rocker panel molding section 26 or 28 or inboard of one of the edges 46. With respect to any of the various shapes of FIGS. 8–14, the bridge elements may be attached to the sections either at the edges thereof or inboard of the edges.

Preferably, bridge elements 42 and 80–92 are unitarity molded with the front and rear sections 26 and 28 of the rocker panel molding 24, however the bridge elements may be of a different material, such as but not limited to, metal or resinous materials different from that of the rocker panel molding so as to make an integral rather than a unitary structure. Preferably, the rocker panel molding 24 is made out of a material such as, but not limited to, thermoplastic polyurethane (TPU), thermoplastic olefins (TPO), ethylene-propylene terpolymer rubber.

From the foregoing description, one skilled in the art can easily ascertain the essential characteristics of this invention, and without departing from the sprit thereof, can make various changes and modifications of the invention to adapt it to various usages and conditions.

What is claimed is:

1. A rocker panel molding for attachment to a rocker panel of an automotive vehicle, comprising:

a single molding unit having a front section and a rear section, with each section having an exterior surface adapted to face outwardly with respect to the vehicle and an interior surface adapted to face inwardly toward the motor vehicle, the sections further having an upper edge portion and a lower edge portion, when mounted on the vehicle; the front section having a rear edge and the rear section having a front edge, the rear edge and the front edge being separated by a gap, and at least one flexible bridge element bridging the gap, the bridge element having a front end and a rear end, the front end being in cooperative relation with the rear edge of the front section and the rear end being in cooperative relation with the front edge of the rear section.

2. The rocker panel molding according to claim 1 wherein the at least one bridge element is unitary with the front and rear sections.

3. The rocker panel molding according to claim 2 wherein the at least one bridge element extends inwardly toward the vehicle with respect to the exterior and interior surfaces of the front and rear sections of the rocker panel molding.

4. The rocker panel molding of claim 3 wherein the at least one bridge element is resilient, whereby as the front and rear edges of the rear and front sections, respectively, move toward and away from one another, the at least one bridge element flexes to accommodate narrowing and widening of the gap.

5. The rocker panel molding according to claim 4 comprising an upper bridge element and a lower bridge element, the upper bridge element being disposed adjacent to the upper edge portions of the front and rear sections comprising the rocker panel molding, and the lower bridge element being disposed adjacent to the lower edge portions of the front and rear sections comprising the rocker panel molding.

6. The rocker panel molding according to claim 5 further including a tab extending from the edge of one section into the gap and toward the edge of the other section to slide behind or into the edge of the other section to visually close the gap upon movement of at least one of the edges toward the other.

7. A rocker panel molding for attachment to a rocker panel of an automotive vehicle, comprising:

a unitary molding having a front section and a rear section, with each section having an exterior surface adapted to face outwardly with respect to the vehicle and an interior surface adapted to face inwardly toward the motor vehicle, the sections further each having an upper side portion and a lower side portion when mounted on the vehicle; the front section having a rear edge and the rear section having a front edge, the rear edge and the front edge being separated by a gap, and first and second flexible bridge elements bridging the gap, the bridge elements each having a front end and a rear end, the front ends of each bridge element being unitary with the rear edge of the front section, whereby as the front and rear edges of the rear and front sections move toward and away from one another, the bridge elements flex to accommodate narrowing and widening of the gap.

8. The rocker panel molding according to claim 7 wherein the bridge elements extend inwardly toward the vehicle with respect to exterior and interior surfaces of the front and rear sections of the rocker panel molding.

9. The rocker panel molding according to claim 8 wherein the bridge elements are laterally spaced with one of the bridge elements positioned adjacent to and in spaced relation to the upper edge portions of the front and rear sections and the other bridge element being positioned adjacent to and in spaced relation with respect to the lower edge portions of the front and rear sections.

10. The rocker panel molding according to claim 9 wherein the front and rear ends of the bridge elements are connected by front and rear spans joined by bights positioned inboard of the front and rear ends with respect to the upper and lower edge portions of the front and rear sections.

11. The rocker panel molding according to claim 10 wherein the bridge elements are V-shaped, arcuate or polylogonal.

12. The rocker panel molding according to claim 7 further including a tab extending from the edge of one section into the gap and toward the edge of the other section to slide behind or into the edge of the other section to visually close the gap upon moving the edges toward one another.

* * * * *